US008204910B2

(12) United States Patent
Tedesco et al.

(10) Patent No.: US 8,204,910 B2
(45) Date of Patent: Jun. 19, 2012

(54) MEDIA DEVICE PRESENCE MANAGEMENT

(75) Inventors: Megan Lesley Tedesco, Sammamish, WA (US); Yasser Asmi, Redmond, WA (US); Ivan J. Leichtling, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 641 days.

(21) Appl. No.: 11/674,905

(22) Filed: Feb. 14, 2007

(65) Prior Publication Data

US 2008/0195621 A1 Aug. 14, 2008

(51) Int. Cl.
*G06F 17/30* (2006.01)
(52) U.S. Cl. ........................................ 707/785
(58) Field of Classification Search ........................ None
See application file for complete search history.

(56) References Cited

U.S. PATENT DOCUMENTS

| 5,054,019 | A | * | 10/1991 | Mathis et al. | 370/296 |
|---|---|---|---|---|---|
| 5,611,050 | A | | 3/1997 | Theimer et al. | |
| 6,795,846 | B1 | | 9/2004 | Merriam | |
| 6,862,737 | B1 | | 3/2005 | Iwamura et al. | |
| 7,474,888 | B1 | * | 1/2009 | Davis et al. | 455/411 |
| 7,552,175 | B2 | * | 6/2009 | Luo et al. | 709/205 |
| 2003/0079003 | A1 | * | 4/2003 | Burr | 709/221 |
| 2004/0015403 | A1 | | 1/2004 | Moskowitz et al. | |
| 2005/0007967 | A1 | | 1/2005 | Keskar et al. | |
| 2005/0088980 | A1 | * | 4/2005 | Olkkonen et al. | 370/255 |
| 2005/0213563 | A1 | | 9/2005 | Shaffer et al. | |
| 2006/0055958 | A1 | * | 3/2006 | Kim et al. | 358/1.14 |
| 2006/0101266 | A1 | * | 5/2006 | Klassen et al. | 713/170 |
| 2006/0148477 | A1 | * | 7/2006 | Reilly | 455/436 |
| 2006/0172770 | A1 | | 8/2006 | Fyke et al. | |
| 2006/0235994 | A1 | | 10/2006 | Wu | |
| 2007/0141989 | A1 | * | 6/2007 | Flinchem | 455/41.2 |
| 2007/0274271 | A1 | * | 11/2007 | Jones et al. | 370/338 |
| 2008/0072292 | A1 | * | 3/2008 | Narjala | 726/4 |
| 2009/0325609 | A1 | * | 12/2009 | Rosen et al. | 455/466 |

OTHER PUBLICATIONS

Law et al., "Smart Instant Messenger in Pervasive Computing Environments," http://www.cs.hku.hk/~clwang/papers/GPC2006-SIM-Camera.pdf.
Kaneda, Y., "Multi-Context Voice Communication in a SIP/SIMPLE-Based Shared Virtual Sound Room With Early Reflections," NOSSDAV'05, 2005, http://delivery.acm.org/10.1145/1070000/1065996/p45-kanada.pdf?key1=1065996&key2=6418362611&coll=GUIDE&dl=GUIDE&CFID=5202349&CFTOKEN=28204213.
Huang et al., "A Privacy Conscious Bluetooth Infrastructure for Location Aware," http://people.csail.mit.edu/albert/pubs/2004-albert-infrastructure-for-location-aware-computing.pdf.
da Silva et al., "Agent-Based Management of Responsive Environments," http://www.csd.abdn.ac.uk/~wvasconc/pubs/resp_envs.pdf.

* cited by examiner

*Primary Examiner* — Bai D. Vu

(57) ABSTRACT

A media player may be adapted to manage presence information distribution and access to facilitate media communication between compatible devices. Devices connecting in an ad-hoc or other network topology include a plurality of presence settings that determine how or if the device appears to be available for communication to other devices over the network. Additionally, the presence settings identify other, specific devices or groups of devices that may communicate with a device. By comparing the presence settings of a sending device with the settings of a receiving device, the receiving device may determine a presence state for all devices within communication range.

12 Claims, 11 Drawing Sheets

MEDIA DEVICE PRESENCE MANAGEMENT

BACKGROUND

The Background is intended to provide the basic context of this patent application and is not intended to describe a specific problem to be solved.

Digital media players are in common use among a broad base of users. Presently, streaming digital media is available over both wireless and wired networks and may be displayed on cellular telephones and other portable media devices.

Media players may send and receive content over a variety of data networks including cell-based and isochronous networks. The IEEE 802 standard family describes various local and wide-area networks (LAN or WAN, respectively) that carry variable-sized packets encoding digital media. The 802 standard encompasses protocols for both wired (e.g., 802.3, or Ethernet) and wireless (e.g., 802.11, or "WiFi") networks. The 802.11 standard describes the protocols used to transfer data when a device is connected to a wireless network.

The station is the most basic component of the wireless network and is any device that contains the functionality of the 802.11 standard and a connection to the wireless device. Typically the 802.11 functions are implemented in the hardware and software of a network interface card (NIC). A station could be a media player, a laptop PC, handheld device, or an Access Point. Stations may be mobile, portable, or stationary and all stations support the 802.11 services of authentication, de-authentication, privacy, and data delivery. A collection of any number of stations is called a Basic Service Set (BSS). Generally, stations communicate by connection to other stations in an independent BSS, an ad-hoc network, or by connection to a central access point in an infrastructure BSS.

In some network connections, presence technology allows network stations to publish their availability for network interaction. In general, presence information indicates a particular user's ability and willingness to communicate with other network users. Presence information, or presence state, is communicated over the network to a presence service or directly to a presence-enabled device. Either directly or via the presence service, the information is distributed to other network users to convey the user's availability for present network communication or interaction.

A media player or other computing device that is connected to a network may stream media content to other connected devices. While receiving streaming media content, connected devices may also publish presence state information. Further, users may choose to override their presence state by, for example, selecting a "busy" state while they are "online" and able to receive streamed content. However, merely being able to choose a presence state may broadly limit a user's ability to receive content while still allowing other users to see that, while a "busy" device may not be available for communication, it is still within range and connected to the network. If a large number of devices are within range, sifting through all connected devices to find a device with which a user wishes to communicate may become unmanageable. Likewise, merely publishing presence state information, without more, may not provide either sending or receiving stations with adequate information to attempt a connection with an available device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A media player may be adapted to manage presence information distribution and access to facilitate media communication between compatible devices. In one embodiment, devices connecting in an ad-hoc or other network topology include a plurality of presence settings that determine how or if the device appears to be available for communication to other devices over the network. Additionally, the presence settings identify other, specific devices or groups of devices that may communicate with a device. By comparing the presence settings of a sending device with the settings of a receiving device, the receiving device may determine a presence state for all devices within communication range. Further communication between the deices may then be made within the parameters established by the presence settings.

The media device may be a handheld device, a virtual player on a computer, a set-top box, a cellular telephone, or other device capable of supporting media objects, a user interface, and in many cases, external communication.

DETAILED DESCRIPTION

Figure 1:
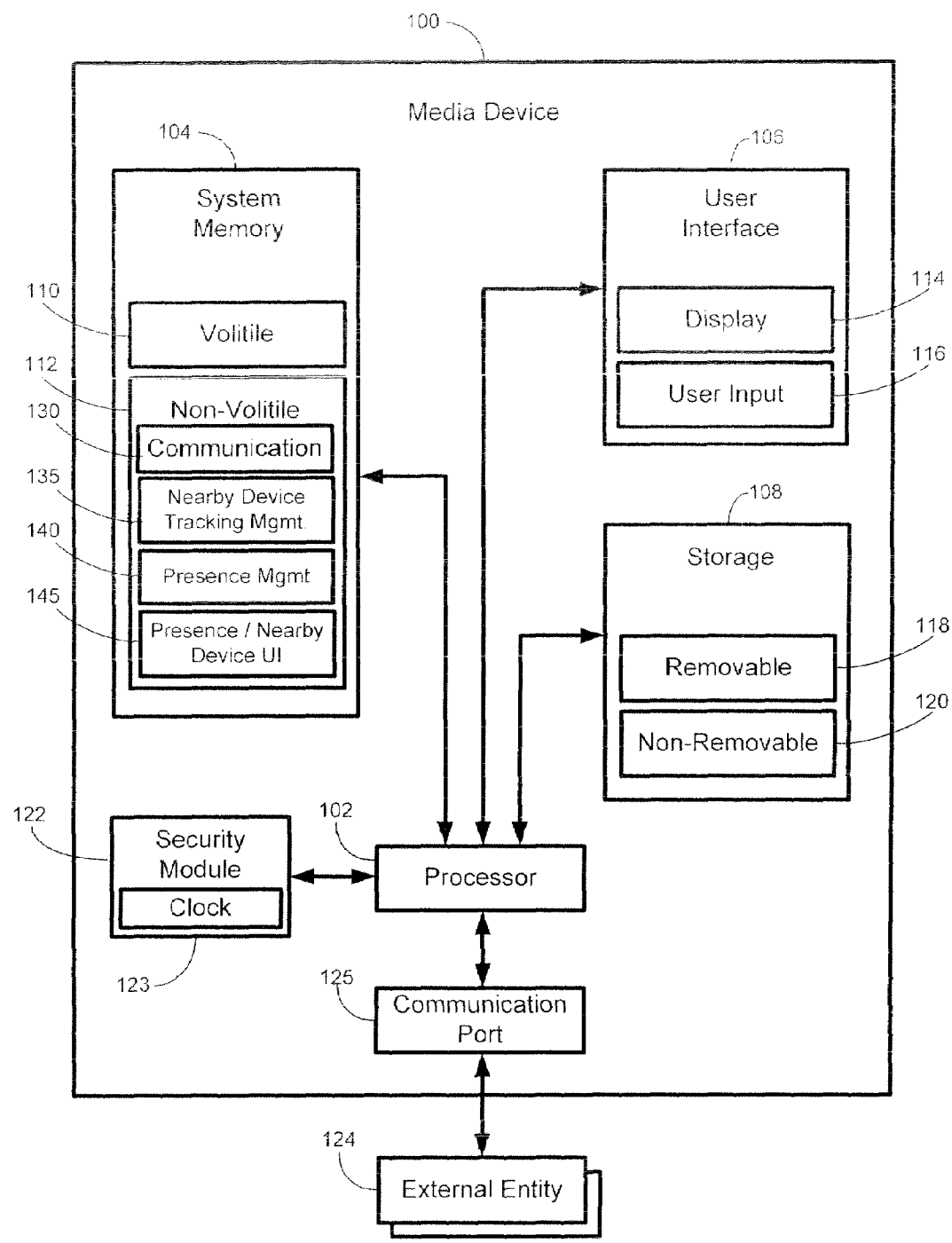
FIG. 1 is an illustration of hardware for a portable media device.
Figure 2:
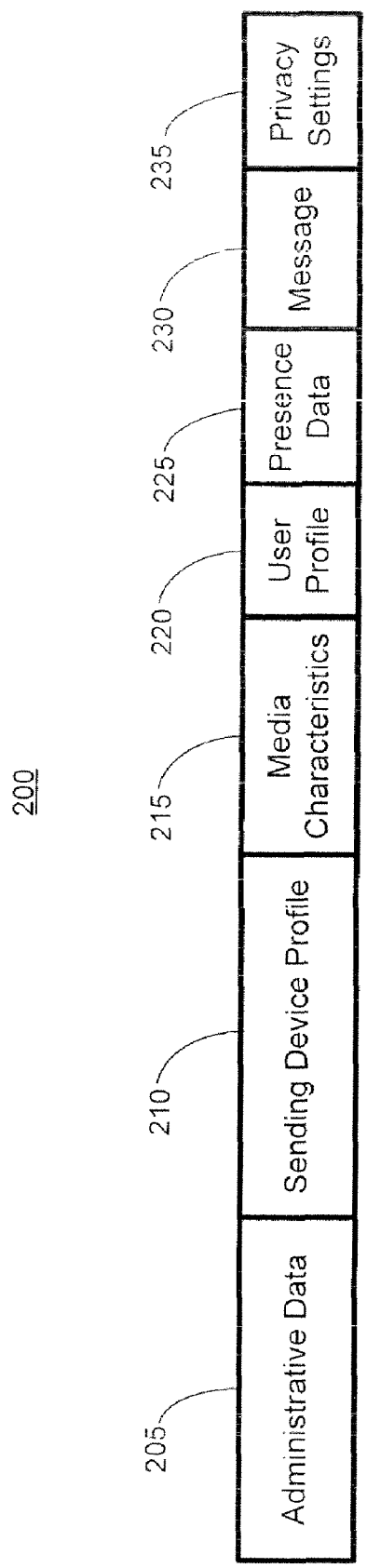
FIG. 2 is a block diagram of an announcement message passed between connecting media devices.

FIG. 1 is an illustration of exemplary hardware that may be used for a media device 100 that may manage media device presence information. The media device 100 may have a processing unit 102, a memory 104, a user interface 106, a storage device 108 and a power source (not shown). The memory 104 may include volatile memory 110 (such as RAM), non-volatile memory 112 (such as ROM, flash memory, etc.) or some combination of the two.

The media device 100 may also include additional storage 108 (removable and/or non-removable) including, but not limited to, magnetic or optical disks or tape or any other memory that can be easily rewritten, may keep data for long periods of time when power is removed, and may allow quick and efficient access to data. Such additional storage is illustrated in FIG. 1 by removable storage 118 and non-removable storage 120. Computer storage media includes volatile and nonvolatile, removable and non-removable media implemented in any method or technology for storage of information such as computer readable instructions, data structures, program modules, digital media, or other data. Memory 104, removable storage 118, and non-removable storage 120 are all examples of computer storage media. Computer storage media includes, but is not limited to, RAM, ROM, EEPROM, flash memory or other memory technology. Any such computer storage media may be part of device 100.

The processing unit 102 may be any processing unit 102 capable of executing computer code to decode media data from a compressed format into a useable form fast enough such that music and video may be played continuously without skips or jumps. When in a portable media device, it may also be useful if the processor 102 efficiently uses power to increase the life of the power source. The processing unit 102 may also be used to execute code to support a user interface and external communications.

The user interface may include one or more displays 114 for both displaying control information and displaying viewable media. The display 114 may be a color LCD screen that fits inside the device 100. While any mode of input device would work with the concepts of the present invention, user input(s) may include either manual buttons, soft buttons, or a combination of both. Soft buttons may be used when the display 114 includes a touch screen capability. Manual buttons may include re-definable keys with programmable legends.

A security module 122 may be coupled to the processor. The security module 122 may be used to store cryptographic keys used in digital rights management (DRM). The security module 122 may also have specialized hardware or processors for performing cryptographic calculations, such as stream decryption, without burdening the processor 102. Lastly, the security module 122 may include secure memory for storing record data associated with limited use rights for received media objects. The security module 122 may also include a tamper resistant clock for determining expiration periods on licenses. Management of limited use rights for media objects is discussed in more detailed below.

The media device 100 may also contain communications port of connection(s) 125 that allow the device 100 to communicate with external entities 124, such as network endpoints, other media devices, network access points, or a computer used for synchronization. Communications connection(s) 125 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The power source may be a battery that may be rechargeable. The power source may also be a standard battery or an input from a power converter or any other source of power.

A variety of functions, implemented in logic or software, may be used to support tracking and organizing nearby media devices 100, 124. Such functions may include a communication module 130, a nearby device tracking management module 135, and a nearby device tracking user interface that may facilitate user interaction related to tracking and organizing nearby devices. Such functions may include a communication module 130, a nearby device tracking management module 135, a presence module 140, and a presence and nearby device tracking user interface 145, that may facilitate user interaction related to tracking and organizing nearby devices as well as managing presence information.

In operation, a user may connect to external entities 124 through a variety of network types to include local and wide area networks using any number of communication protocols, standards, and topologies. For example, a media device may connect to a network implementing any of the Ethernet, ARCNet, FDDI, IEEE 1394, and Token Ring, or TCP/IP standards. Media devices may connect to each other through a central access point or in an ad hoc fashion. Once connected, the devices may share and transfer data files including media content that is stored in the device 100, 124 storage 108.

A user may receive a media object, including, for example, music or video content, or virtually any computer based file or collection of files, over the communication port 125. In one embodiment, the media object is communicated over an ad-hoc wireless network from an external device 124. To illustrate, the media object may have been purchased for use on the external device 124 and the user of the external device 124 may be entitled to full and unlimited access to that media object using that device. The user of the external device 124 may wish to share the media object with a user of the media device 100 and may forward or stream the media object to the media device 100.

While connected, the device 100 may not only transfer files or media content, but may also stream data for immediate, one-time consumption. Streaming data in this fashion, especially streaming audio or video content may be referred to as a disk jockey (DJ) session. A streaming session may be one-to-one, or may be a multicast, that is, one-to-many. Both inbound and outbound DJ sessions may be supported, that is, media content may be sourced from an external media device 124 and streamed to a receiving media device 100 or may be received from another source device.

In general, to establish a connection to an external device 124 or to broadcast to a number of external devices 124, a sending device 100 may send an announcement message 200 to nearby devices 124. Upon receipt of the announcement message 200, the external device 124 may return an acknowledgement message 300 to the sending device 100. The interaction of the announcement 200 and acknowledgement 300 messages may determine parameters associated with any communication session between the device 100 and the external device 124 as well as the management of presence information. Many other methods of connecting media devices 100, 124 are also possible.

The announcement 200 may be generally broadcast to any external device 124 within communication range of the device 100. Alternatively, the device 100 may transmit the announcement 200 to a specific external device 124. The announcement 200 may be any message that may organize and synchronize communication between the devices 100, 124 as well as provide detailed information about the sending device 100 to a nearby, external device 124. In one embodiment, the announcement 200 is transmitted as a modified beacon management frame. In another embodiment, the announcement is sent to a specific external device 124 as a probe request management frame. In still another embodiment, the announcement is sent as part of the authentication process employed by devices attempting to connect using the 802.11 standard. The announcement 200 may include administrative data 205 such as a time stamp from the secure clock 123 of the device security module 122, frequency-hopping spread spectrum (FHSS) and direct sequence spread spectrum (DSSS) parameters, an identification or name of the network (SSID), a traffic indication map (TIM), and supported data transmission rates.

In another embodiment, the announcement 200 includes a sending device 100 profile 210. For example, the sending device profile 210 may include data related to the device 100 and may include a network interface card (NIC) address, a unique device identifier, a firmware or software version number, a device type, a total storage capacity, a remaining storage capacity, an activation date, a manufacturing date, or any other data related to the sending device 100. The unique device identifier may be a Globally Unique Identifier (GUID). The GUID may be based on the device's NIC address and time stamp or may be generated in any other suitable manner.

Media characteristics 215 may also be included in the announcement 200. In one embodiment, media characteristics 215 may be related to media objects 400 stored in a media library 108, as described below, or being processed by the device 124. For example, the media characteristics 215 may include, without limitation, metadata 410 describing any portion or all of the media objects 400 stored in the device 100 media library 108. As explained below in relation to FIG. 4, media objects 400 may include a variety of media types including music, video, text or audio-based books, electronic games, photos, or audio and video messages. Media characteristics 215 may include any or all data related to media objects 400 stored on the device 100 or being processed by the device 100 without storage (i.e., streaming), a device 100 current activity, or data related to a media object 400 that is currently playing or has been played on the device 100. Further, media characteristics 215 may include statistical information associated with the media objects 400 stored or played on the sending device 100. Statistical information may include data that facilitates identifying a most-played song, a most or least-played genre, a most or least-played media object 400 type or any other statistical data.

Other announcement 200 information may include user profile 220 data. For example, the user profile 220 may include a unique sender identifier, demographic data associated with the device 100 user, profile data associated with users of different external devices 124 that the sending device 100 user has identified as "trusted" or has otherwise classified, or other users connected to the sending device 100. The user profile 220 may also include a name that may be set by the user to personally identify him or herself to other connected devices. Of course, sender profile data could include a variety of additional information.

The announcement 200 may also include device 100 presence data or presence state 225. For example, the presence state 225 may be any combination of sleeping (in power saving mode), busy (currently engaged in sending or receiving a file or listening to a media stream), blocked, Music—listening to [artist name][song title], Radio—listening to radio station [frequency][artist name][song name], Video—watching [video title], Print Media—reading [title][author], Game—playing [game title], Message—listening to or reading message from [other device user], or Photos—viewing [photo title][image data]. In one embodiment, the presence state 225 is combined with any other announcement 200 data to provide more information to an external device 124. For example, the presence state 225 may be combined with the traffic indication map of the administrative data 205 to provide data to identify other devices 124 with a presence state of "sleeping" or "busy" that have data frames in an access point or external device 124 buffer.

Also, the presence state 225 related to a media object 400 (i.e. Music, Video, Print Media, Game, etc.) may be combined with the media characteristics 225 to provide detailed information about a currently playing media object 300 or a media object 400 stored on the device 100. In one embodiment, presence data 225 includes preferences that are set by the sender. For example, the presence preferences 225 may define characteristics of nearby devices 124 that may 'see' or have permission to be notified of the existence of the sending device 100. In a further embodiment, presence preferences 225 may block specific nearby devices 124 or nearby devices 124 meeting one or more characteristics. Blocking may include, without limitation, preventing a receiving device 124 user from viewing the device's 100 presence data or media characteristics 215, or participating in a DJ session. In an alternative embodiment, the presence preferences 225 is stored and modified at the device 100.

Further, the announcement may include a welcome message that may be customized by a device 100 user. The message may be customized by the user at the time the announcement 200 is sent or may be set in advance. For example, a business welcome message may be useful for business meetings where formal information such as titles, business telephone numbers, business fax numbers and other business information may be logically exchanged. In another example, a social welcome message may include less formal information such as the nickname of the owner, a favorite comic strip, an astrological sign, a list of humorous likes and dislikes, etc. The message may be sent to other devices 124 as part of an announcement 200, alone, or as part of other communications.

The announcement 200 may also include privacy settings 235. For example, the privacy settings 235 may restrict, without limitation, the presence state 225 that is visible to other devices 124 or the amount of data that is included in the announcement 200 before it is sent to other devices 124. In another embodiment, the privacy settings 235 may restrict the amount of data that a receiving device 124 user may view from the announcement 200. For example, the privacy settings 235 may restrict what announcement 200 data a user may view from an external device 124 appearing in a "Nearby Devices" interface. Additionally, the the privacy settings 235 may allow or restrict sending or viewing the device's 100 media characteristics 215 including information related to a media object 400 that is currently playing, stored, or being sent to the external device 124. As filtered through the privacy settings 235, the announcement 200 may include information that the sending user is listening to a particular song or video by incorporating the title and artist name, the source of the media object 400, or other data associated with the media object 400 currently played or processed on the device 100. Privacy settings 235 may also limit sending or viewing the user's activity related to a radio station, photos on his device, or may provide information indicating that the device 100 is not currently engaged in any activity. Of course, many embodiments of the announcement 200 are possible.

Figure 3:
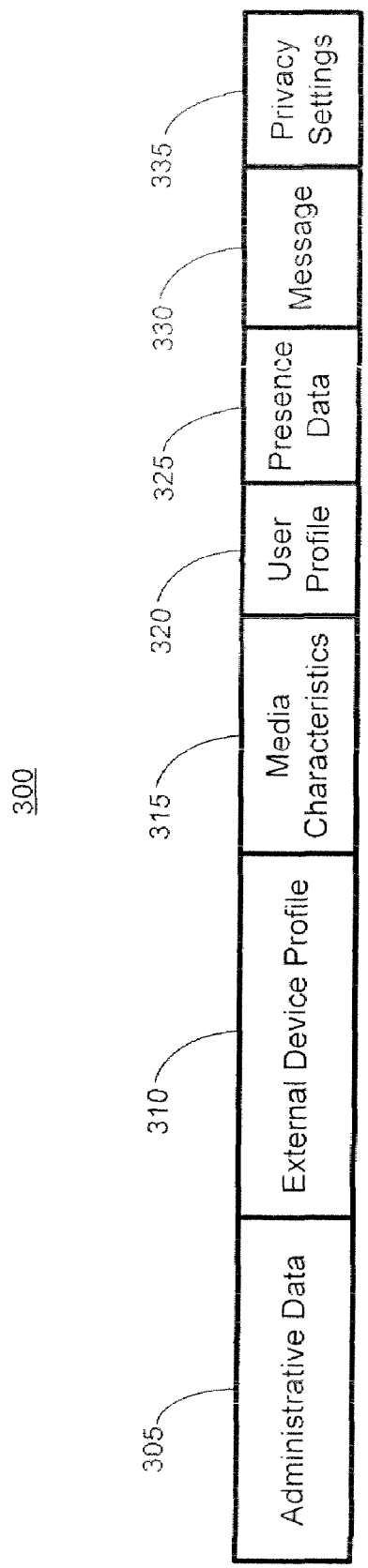
FIG. 3 is a block diagram of an acknowledgement message passed between connecting media devices.

With reference to FIG. 3, a simplified and exemplary block diagram of an acknowledgement message is described. An acknowledgement message 400 may include data from an external device 124 that receives an announcement message 200 from a sending device 100. The acknowledgement message 300 may include data in reply to the announcement message 200. Upon receipt of their respective messages 200, 300, the sending 100 and receiving device 124 may effectively synchronize communications and commence transmission of data.

One element of the acknowledgement message 300 may include administrative data 305. The administrative data 305 may include virtual any information to assist communication. For example, the administrative data 305 may include a time stamp from the secure clock 123 of the device security module 122, communication parameters, an identification or name of the network (SSID), a traffic indication map (TIM), and supported data transmission rates. In one embodiment, the acknowledgement 300 includes an external, receiving device 124 profile 310 including network interface card (NIC) address, a unique device identifier, a firmware or software version number, a device type, a total storage capacity, a remaining storage capacity, an activation date, a manufacturing date, or any other data related to the external device 124. The unique device identifier may be a Globally Unique Identifier (GUID).

As with the announcement message 200, the acknowledgement 300 may include media characteristics 315. In one embodiment, media characteristics 315 may be related to media objects 400 stored in a media library 108, as described below, or being processed by the device 124. For example, the media characteristics 315 may include, without limitation, metadata 410 describing any portion or all of the media objects 400 stored in the device 124 media library 108.

Other acknowledgement 300 information may include user profile 320 data. For example, the user profile 320 may include a unique user identifier, demographic data associated with the device 124 user, profile data associated with users of different external devices 124 that the receiving device 124 user has identified as "trusted" or has otherwise classified, or other users connected to the external device 124. The user profile 320 may also include a name that may be set by the user to personally identify him or herself to other connected devices.

The acknowledgement 300 may also include device 124 presence data or presence state 325. The presence state 325 may be combined with any other acknowledgement 300 data to provide more information to the sending device 100, for example, with the media characteristics 325 to provide detailed information about a currently playing or stored media object 400. In one embodiment, presence data 325 includes preferences that may be set by the sender. For example, the presence preferences 325 may define characteristics of nearby devices 100 that may 'see' or be notified of the existence, of the device 124. In a further embodiment, presence preferences 325 may block specific nearby devices 124 or nearby devices 124 meeting one or more characteristics from viewing the device's presence data or participating in a DJ session. In an alternative embodiment, the presence preferences 325 may be stored and modified at the device 124. The acknowledgement may also include a response message that may be customized by a receiving device 124 user.

The acknowledgement 300 may also include privacy settings 335. For example, the privacy settings 335 may restrict the amount of data that is included in the acknowledgement 300 before it is sent to the initiating device 100. In some embodiments, the privacy settings 335 restrict the amount of data that a sending device 100 user may view from the acknowledgement 300. As filtered through the privacy settings 335, the acknowledgement 300 may include information that the receiving user is listening to a particular song or video by incorporating the title and artist name, the source of the media object 400, or other data associated with the media object 400 currently played or processed on the device 100. Privacy settings 335 may also limit sending or viewing the user's activity related to a radio station, photos on his device, or may provide information indicating that the sending device 100 is not currently engaged in any activity. Of course, many embodiments of the acknowledgement 300 are possible.

Figure 4:
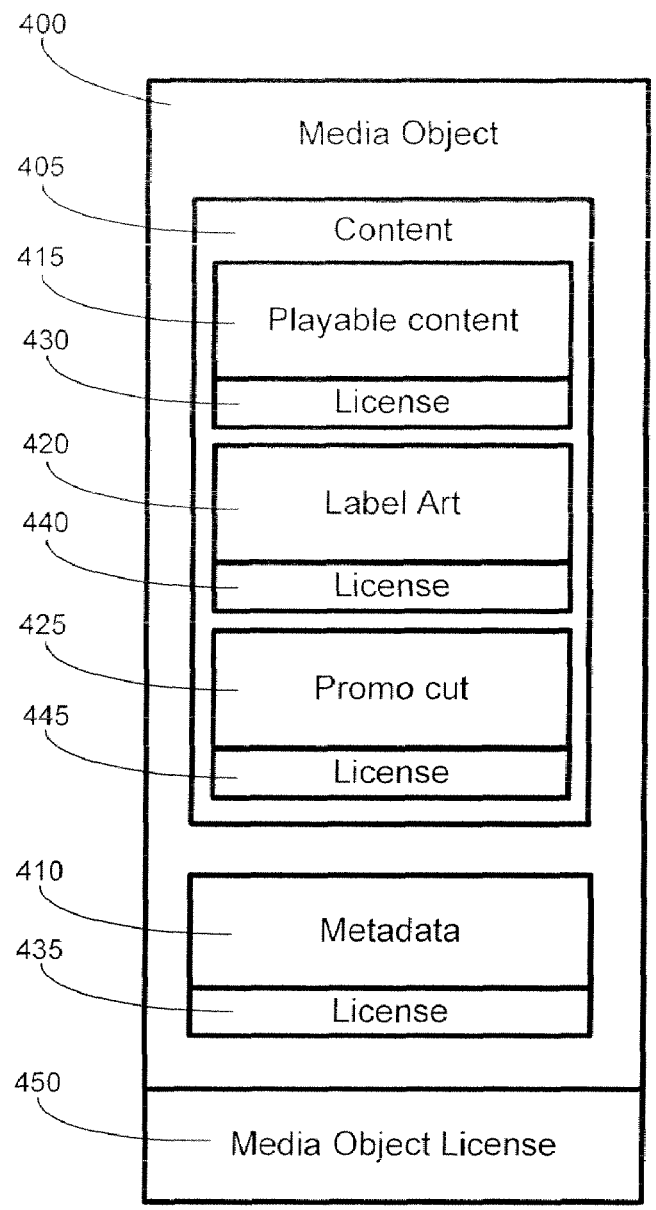
FIG. 4 is a block diagram of an exemplary media object.

Referring to FIG. 4, a simplified and exemplary block diagram of a media object 400 is shown. The media object 400 may include various individual elements including content 405 and metadata 410. The metadata 410 may consist of any information related to the data and may include, without limitation, the object name, an object size, a transfer time, an origin descriptor, an object creation time, an object type, or the number of prior transfers. In one embodiment, the metadata 410 includes information about the sender, for example, a virtual card having information the user may wish to share about himself or herself. More than one type of virtual card may be shared, for example, one card may have likes and dislikes, a top-ten list, favorites, or even an email address, but no personally identifiable information. Another virtual card may have address, phone number, a private email address, or other contact information. Cards may be shared separately or in combination.

If the metadata 410 is associated with a media object, the metadata 410 may also include media information. Without limitation, metadata 410 associated with an audio object may include a song name, an artist name, an album name, a music genre, and a release date. Also, without limitation, metadata associated with a video object may include a title, a television video type, a movie video type, video credits, a family rating, a release date, a duration release date, and a duration. Still further, without limitation, metadata associated with a photo object may include a folder name and a thumbnail version of the photo. Further metadata items for audio, video and other objects may include a media type, artist or creator descriptors, object running time, object size, playlist membership, a rating, and artwork data. As illustrated by the above example, the metadata 410 may contain virtually any information.

The content may include a number of elements as well including, without limitation, playable content 415, label art 420, and a promo cut 425. Playable content 405 may be any form of data that may be interpreted by the media device 100 into an audio or video signal. For example, playable content may be a song, a movie, a photo, a text, or any other type of content that may be fixed to a tangible medium and that may, as with a song or movie, include a temporal element. Label art 420 may be any image associated with the playable content 405. Label art 420 may include an album cover, an advertisement, or a movie poster. Label art 420 may also include more than a single still image, such as a series of images or even video content. A promo cut 425 may be a shorter version of the playable content 405. For example, the promo cut 425 may include an edited version of the playable content 405, or may simply contain one or more references to temporal points within the playable content 405 so that, when accessed, only a portion of the playable content 405 may be heard or viewed. The media object 400 may also contain personalized information such as an audio or video message that may be sent with the media object 400. The device 100 may store and render personalized data separately from the media objects 400 as herein described.

Further, individual DRM rules or limited use licenses may be attached to each of the media object's component elements 400. The DRM role may be any rule or set of rules that limits the use of protected works to allow content owners to determine and control who and how users can view, use, and share digital media objects. For example, a DRM rule may limit the number of times an object may be played within a specific time period. As shown, playable content 405 has license 430, while metadata 410 has license 435, label art 420 has license 440, and the promo cut 425 has license 445. Each element may not be present in every media object 400. For example, a media object may only have playable content 405. In one embodiment, when an element or media object license is not present, rules in the receiving media device 124 security module 122 are activated to apply a default license to the received media object 400, or any predetermined element.

A media device 100, 124 may store a plurality of media objects 400 in storage 108. When containing any number of media files, the storage 108 may also be referred to a media library 108. When sending, receiving, storing, or performing any action that includes media objects 400, the device 100, 124 may use the media library 108 as both a source and a repository of media objects 400. Of course, the device 100, 124 may also access media objects 400 from other internal or external data storage areas, for example, without limitation, external hard disks, flash drives, memory cards, or PCMCIA memory cards.

Figure 5:
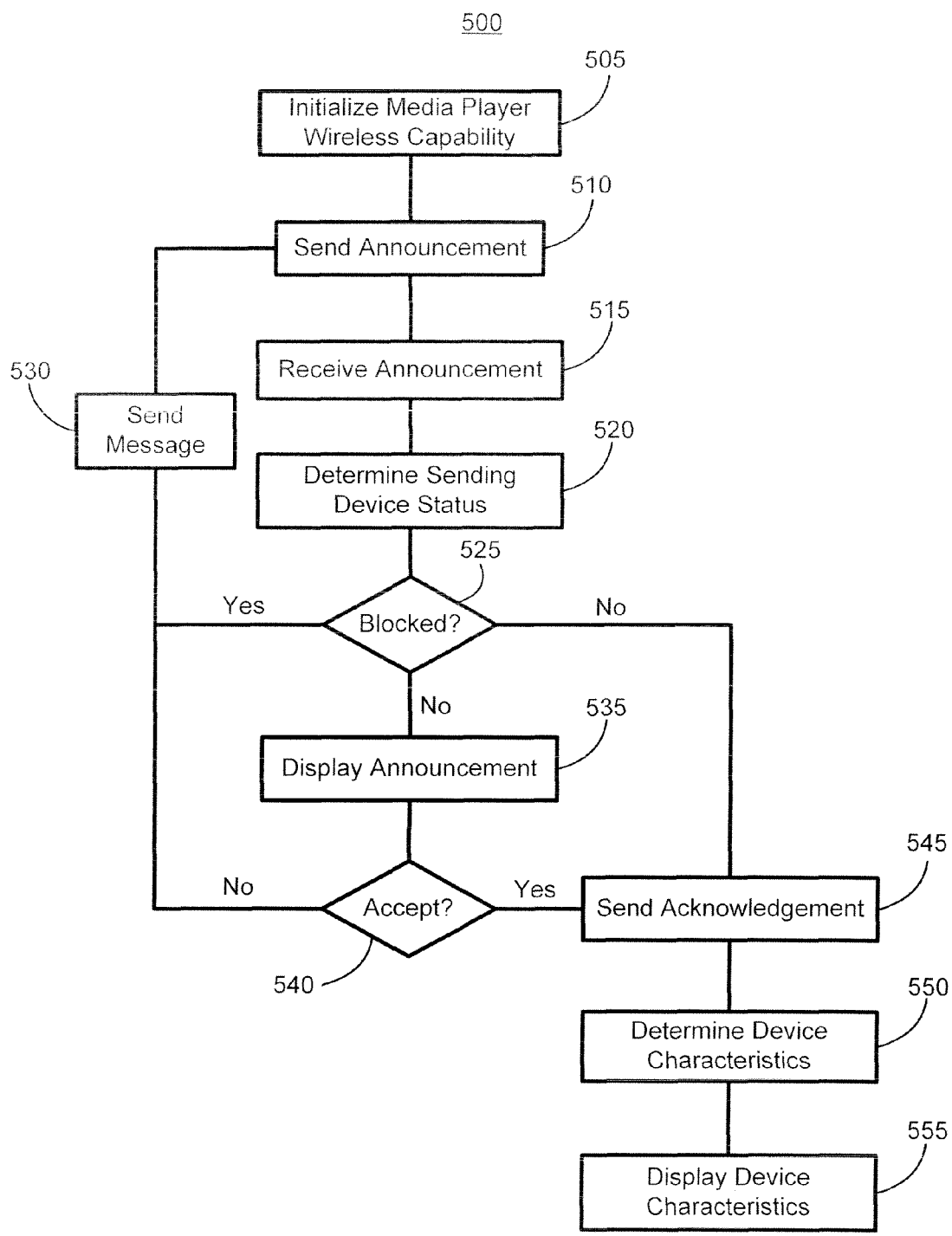
FIG. 5 is a flow chart of a method for managing media device presence information.

With primary reference to FIG. 5, a method 500 of managing nearby media device presence information is described. In one embodiment, the method 500 is implemented within the communication module 130, the nearby device tracking management module 135, the presence module, 140, and the presence and nearby device tracking user interface module 145, with the additional support of various device 100 structures. Of course, there may be a variety of ways to implement the method 500. Generally, the method 500 may be used manage presence information of media devices employing the 802.11 standard, but may also describe a method for tracking any combination of devices 100 and/or external devices 124 to a wired or wireless network. While the following procedure is described form the standpoint of a media device 100 communicating with an external entity 124, the method may also describe an external entity 124 communicating with a media device, or any compatible device connecting to either the external entity 124 or the media device 100. Additionally, messages passed between device 100 and external device 124 may also pass through a number of intermediary nodes in a multi-loop ad-hoc or peer-to-peer fashion, or through an access point that routes and distributes communication between multiple devices 100, 124.

Figure 6:
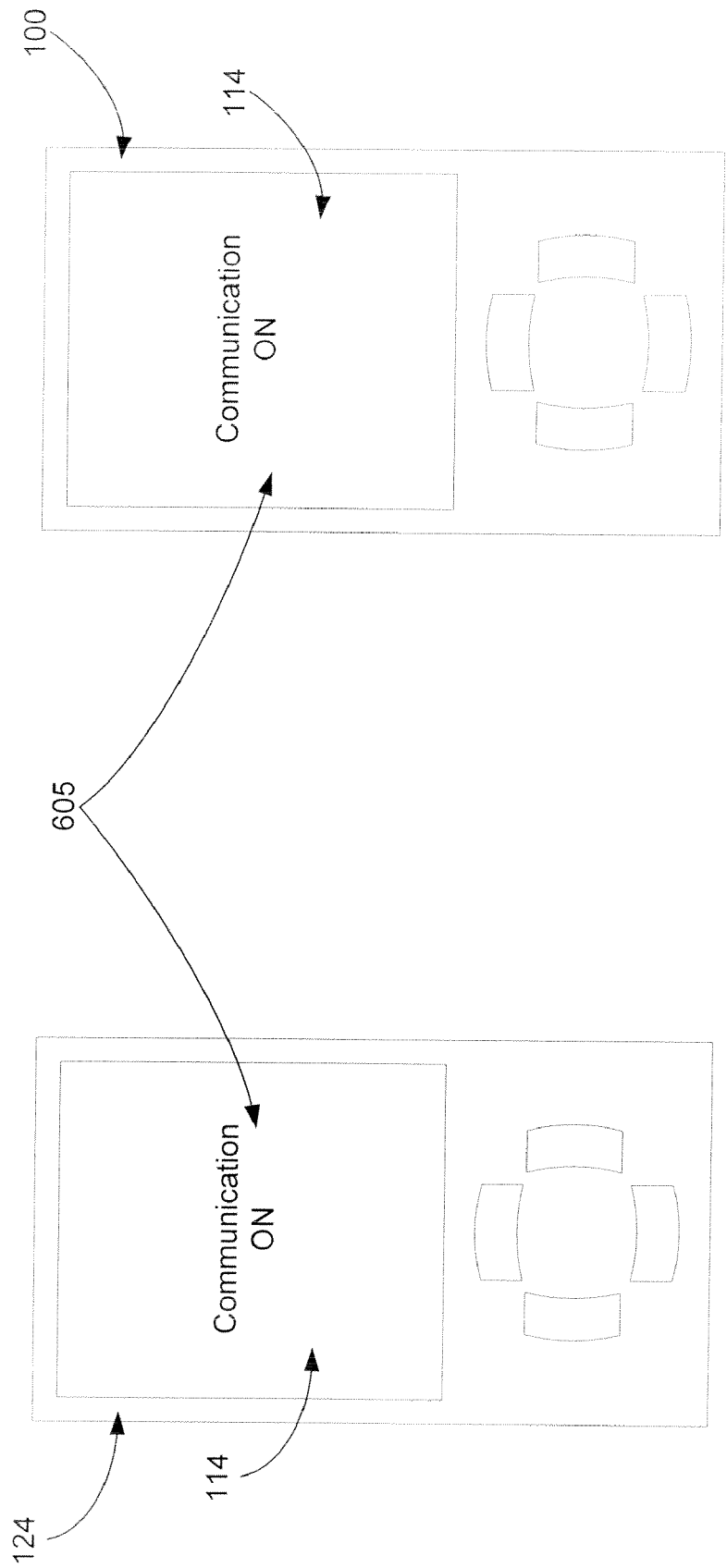
FIGS. 6-11 are illustrations of media devices as they manage media device presence information.

At block 505, the media device 100 and external device 124 may be initialized. For example, users may turn on the device 100, 124 or the users may enable a communication capability within the communication module 130 of the devices 100, 124. Upon enabling a device's communication capability, the device 100, 124 may search for signals from other devices. With reference to FIG. 6, in one embodiment, the display 114 of the devices 100, 124, presents a notification or message 605 to the user indicating that the wireless function of the device 100, 124 is enabled or indicates that the device 100, 124 is attempting to recognize or connect to other devices. The message 605 may present identical or different information on each device 100, 124. Of course, there are numerous ways to provide notification 605 to a user, such as a noise, a vibration, a highlight, etc. Further, the device 100, 124 may enter a power saving or other efficiency mode upon initialization to conserve devices 100, 124 resources such as battery power. As is known, many other forms of initialization are possible.

Figure 7:
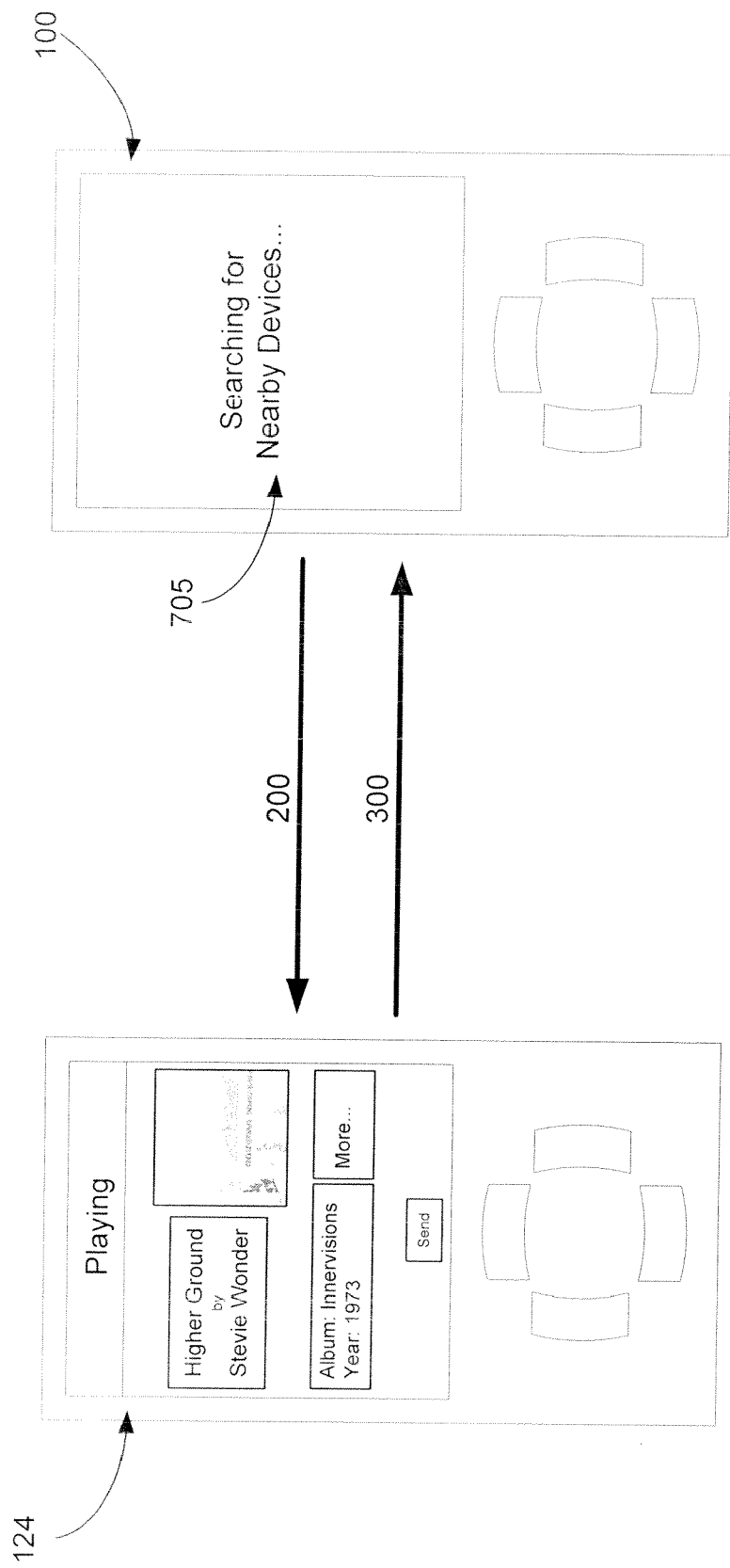

At block 510, the device 100 may transmit an announcement 200. The announcement may be generally broadcast to any external device 124 within communication range of the device 100. Alternatively, the device 100 may transmit the announcement 200 to a specific device 124. With reference to FIG. 7, transmission of the announcement 200 may display a notice or message 705 in the display indicating that the device 100 is searching for compatible devices. Numerous manners of notification are possible.

The transmission of the announcement 200 may be restricted by the announcement 200 presence preferences 225. In one embodiment, a user may restrict the ability of nearby devices 124 matching the set preferences 225 to 'see' or otherwise identify the potential sending device 100 or characteristics of the sending device user. In another embodiment, limiting the visibility of the sending device 100 to other external devices 124 may limit the ability of the external devices to communicate or otherwise interact with the device 100. For example, the sending device 100 user may desire to broadcast only to external devices meeting the preferences 325.

The device 100 presence preferences 225 may shape the visibility of the device 100 to the external device 124 according to any of the information at the external device 124. For example, without limitation, the presence preferences 225 may limit presence visibility to external devices 124 having a particular user name, a specific music or video title, artist, or album, that are currently engaged in a DJ session, that are processing a particular media object or genre of media objects, that meet certain user profile characteristics, or any other preference that may be found in data associated with the external device 124.

At block 515, the external device 124 may receive the announcement 200 from the device 100. In one embodiment, once initialized, the external device 124 passively "listens" for announcements 200 on a number of channels on the communication port 125. The announcements 200 may originate from any source and the device 124 may listen for a fixed or variable amount of time at each channel. In another embodiment, the external device 124 may actively scan for a specific sending device 100. When actively scanning, the external device 124 may also send an announcement 200 identifying a specific network the device user wishes to join.

In a further embodiment, in addition to the presence preferences 225, the announcement 200 data permits only compatible devices 100, 124 to connect or respond to the message. For example, the announcement 200 may contain an SSID of a desired network. An external device 124 may only respond to or recognize an announcement 200 that includes the desired network SSID. The method may then only permit external devices 124 servicing that SSID to respond or may permit all compatible devices within range of the device 100 that also include the desired SSID to respond. In a further embodiment, the GUID or other unique identifier of the device 100 permits only specific device types to be recognized by other compatible devices 124. For example, only devices produced by a specific manufacturer or that are compatible with the device 100 may be recognized.

At block 520, the receiving external device 124 may perform a number of actions within a nearby device tracking management module 135 and a presence management module 140 using the announcement 200 data. In one embodiment, the external device 124 determines the device 100 status or may store the announcement 200 for reference or processing. For example, the external device 124 may examine data included with the announcement 200 such as the SSID, the sending device profile 210, media characteristics 215, user profile 220, presence data and preferences 225, privacy settings 235, or any other announcement 200 data to determine the sending device 100 status.

By examining the received presence preferences 225, the external device 124 may determine that the sending device 100 status is "blocked." In one embodiment, the external device 124 compares the preferences 225 to a "blocked" list. The blocked list may include groups, classifications, or individual users or devices with which the receiving, external device 124 may not communicate or with which communication is restricted. For example, presence preferences 225 may block communication with any other device 100, 124 including a specific media characteristic 215. In one embodiment, the preferences 225 block communication with any other device 100, 124 including a specific song title and/or artist in the announcement message 200. In another embodiment, the preferences block communication with any device including a specified media genre. Other media characteristics 215, and any other announcement data 200 may also be used in combination with the presence preferences 225 to block or restrict communication with matching devices. The blocked list may be user-generated or may be stored at the device 100, 124 by a manufacturer or sent to the device as part of a network security or other network maintenance measure. Additional methods of creating the blocked list are also possible.

Additionally, the external device 124 may check the announcement message 200 against a "friends" or "trusted list" of devices 100. In one embodiment, an external device 124 provides differing levels of access or acceptance to specifically identified devices or classes of devices. For example, upon downloading a new release from a favorite band, a device user may send a copy of the song to a previously-identified group of friends. In another embodiment, a group and its preferences 225 are stored on one or all of the members' devices 100, 124. In a still further embodiment, the group preferences 225 are published along with other characteristics in the "Nearby Devices" screen as described below. A user that is not a member of the group may then request to join the group and, upon approval from a group administrator, a majority of the group members, or all of the group members, the user may be invited to join. Further, groups or group members may send unsolicited invitations to other devices 100, 124 to join groups. Additional methods of creating the friends, groups or trusted lists are also possible.

Devices may be identified in a group, a trusted list, a blocked list, or a friends list by a GUID or other unique characteristics included in the announcement 300 or other communication. In one embodiment, the external device 124 performs a security check on the announcement 200 data. For example, the external device 124 may determine if the sending device 100 has a secure clock 123 as part of the security module 122. If a device 124 detects a device clock 123 that is not secure, a message may be sent to the sending device 100 that the external device 124 may not accept the announcement.

Figure 8B:
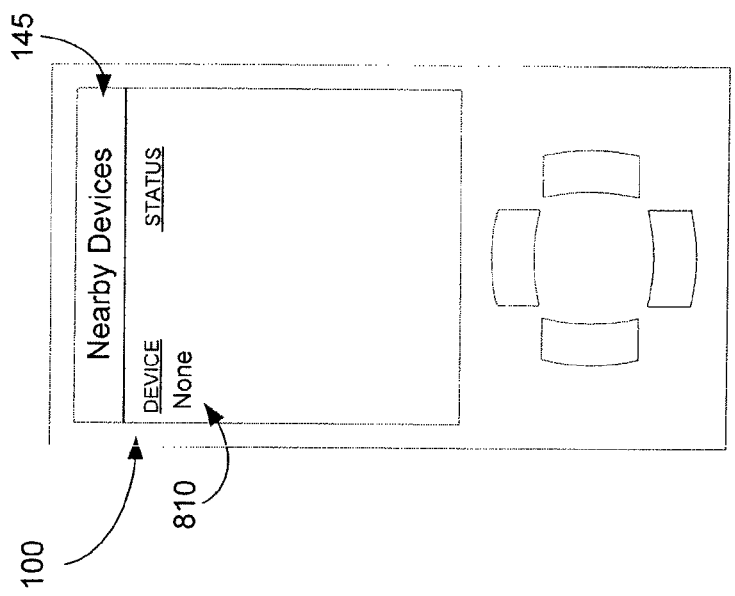
Figure 8A:
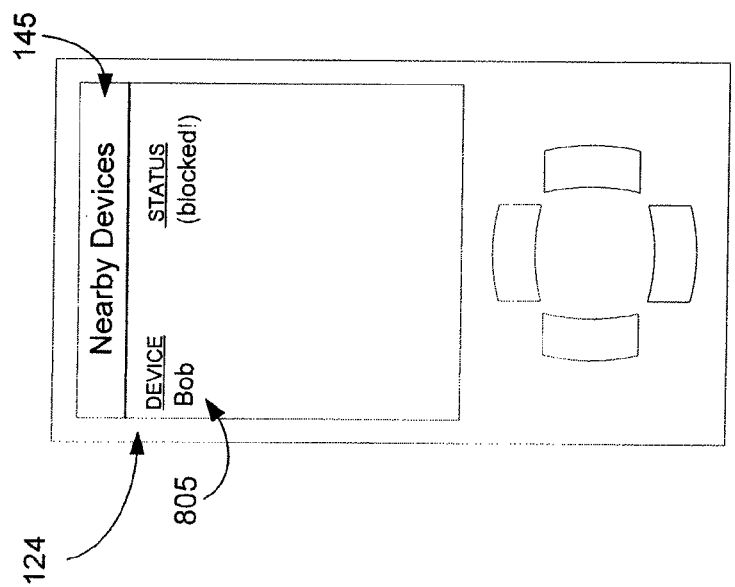

If, at block 525, the external device 124 determined that communication in general, or a specific communication from the sending device 100 status is blocked, the receiving device 124 may, at block 530, send an acknowledgement message 300 to the device 100 indicating the status. With reference to FIG. 8a, in one embodiment, upon receiving the blocked message, the external device 124 displays a notification or other identifier that the device 124 has determined a blocked status 805 for interaction with the external device 124. With reference to FIG. 8b, in another embodiment, the device 100 displays a null message 810 or may not display any information associated with a blocked device 124.

Figure 9:
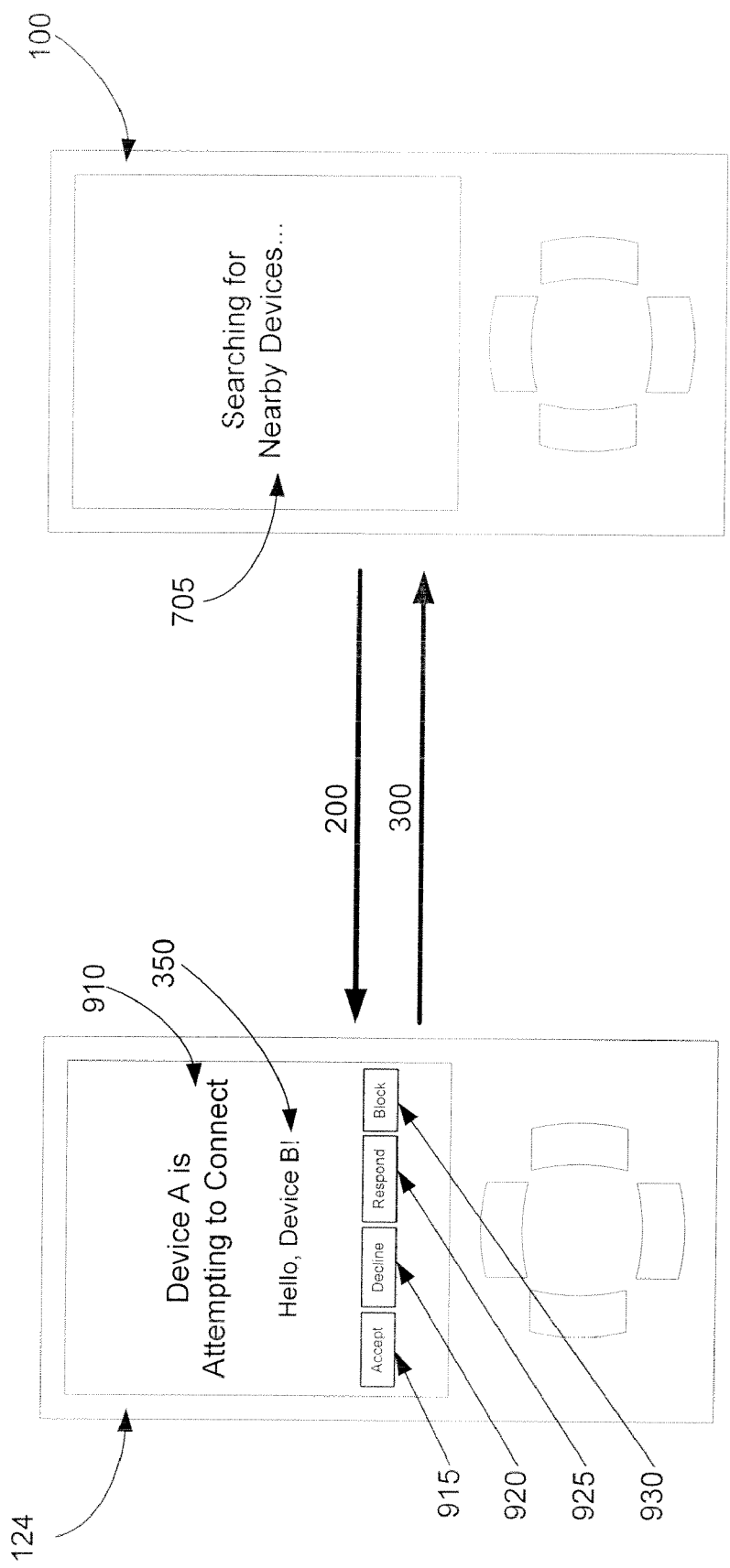
Figure 10:
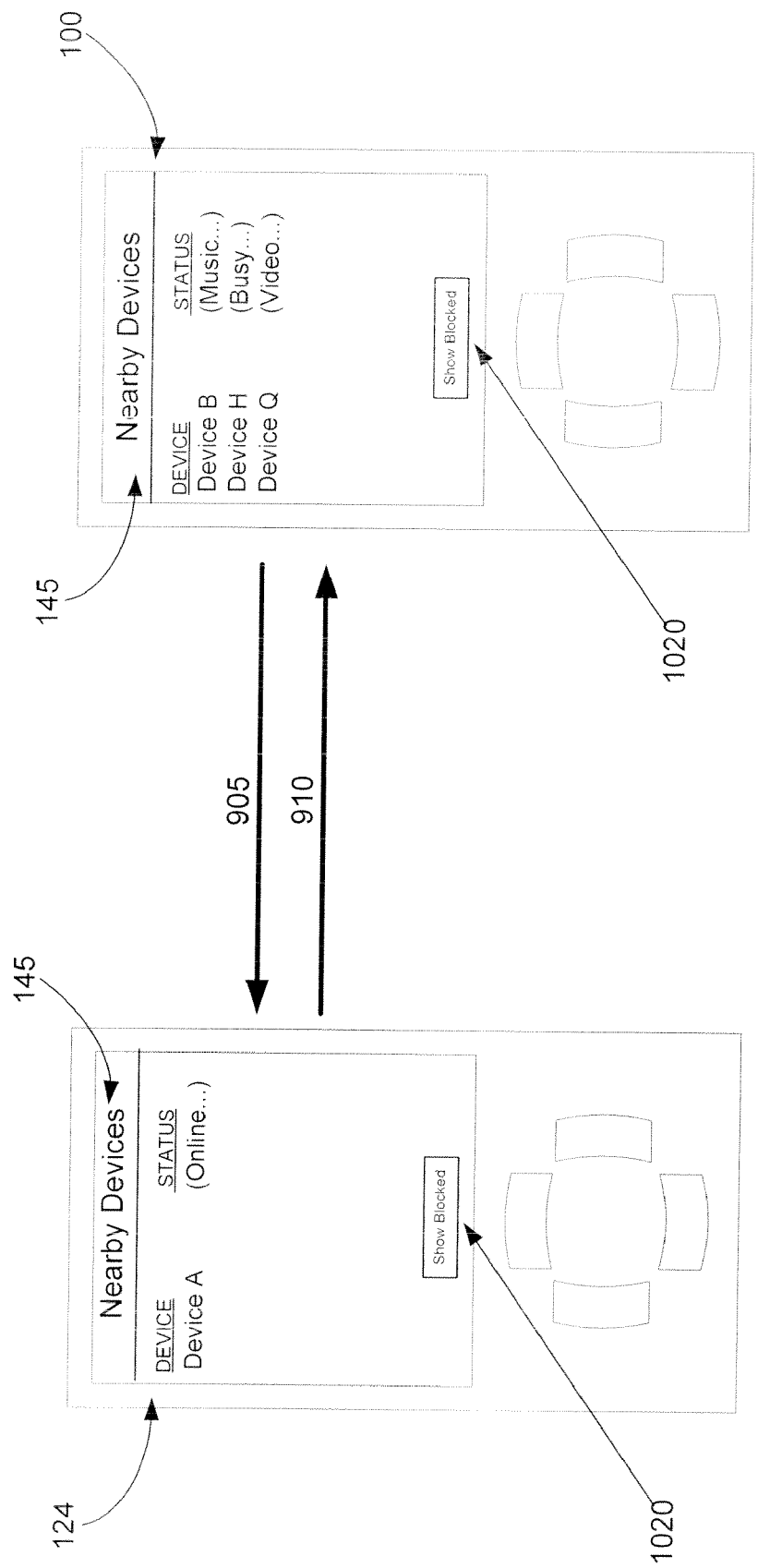

With further reference to FIG. 9, at block 535, the method 500 may display the announcement 200 on the device 100. In one embodiment, the method 500 may interrupt the current activity of the device 124 (i.e., playing a media object 400 or other activity) to display a connection message 910. The connection message 910 may also include data from the announcement 200. For example, the connection message 910 may display information from the sender profile 245 including the name of the sending device 100 or other identifying information, or the welcome message 250.

In addition to the connection message 910, the method 500 may present several processing options to the external device 124 user. For example, the method 500 may allow the user to accept 915, decline 920, respond 925, or block 930 the attempt by the device 100 to connect to the external device 124. In one embodiment, selecting any of the processing options sends an acknowledgement message 300 to the sending device 100. For example, declining 920 the announcement 200 may send an acknowledgement message 300 indicating that the user of the external device 124 may temporarily desire not to connect to the device 100 without placing the device 100 on a blocked list. Responding 925 to the announcement 300 may permit the user of the device 100 to send an acknowledgement message 300 including audio, video, or text communication to the device 100. For example, by selecting "respond" 925, the user may send a customizable message 330 to the device 100. The user may store a number of pre-defined messages 330 to be seen as an acknowledgement 300, or may, at the time of responding, create a suitable response message 330. After sending the message 300, the user of the device 100 may optionally or automatically connect to the device 100. Blocking 930 the announcement 200 may permit the user of the device 124 to place the sending device 100 on a blocked list as previously described.

In another embodiment, after determining that the sending device 100 is not blocked, the method 500 may omit interrupting the external device 124 activity and proceed to block 545. In a further embodiment, if a period of time elapses without the receiving device 124 user responding with a processing option, for example, any of 915, 920, 925, 930, the method 500 sends an acknowledgement message 300 to the device 100 indicating that the intended recipient device 124 has "times out" or otherwise indicate that a connection between the device 100 and the external device 124 is not possible.

If, at block 540, the external device 124 user chooses any of decline 920, respond 925, or block 930, the method 500 may send 530 an acknowledgement message 300 indicating that the device 124 will not process the announcement 200 as previously described. The external device 124 may continue to monitor for messages from a sending device 100 and the ending device may continue to send communications to other devices 124 or to another, specific external device 124.

If, at block 540, the external device 124 user chooses accept 915, the method 500 may send an acknowledgement message 300 to the sending device 100. Upon receipt of the acknowledgement 300, the device 100 may display a message indicating that a connection attempt was successful. In one embodiment, if a period of time elapses without the device 100 receiving an acknowledgement 300, the method 500 sends a message to the external device 124 indicating that the sending device 100 has "timed out" or otherwise indicate that a connection between the device 100 and the external device 124 is not possible.

At block 550, both the device 100 and the external device 124 may determine device characteristics. In one embodiment, the device 100, 124 characteristic are determined by the previously sent announcement 200 and the acknowledgement 300 messages. For example, characteristics of the sending device 100 may be determined by the external device 124 from any element or combination of elements of the announcement message 200. Further, characteristics of the external device 124 may be determined by the sending device 100 from the acknowledgement message 300. In a further embodiment, with reference to FIG. 9, the device characteristics are determined from information requests 905, 910 sent between the device 100 and the external device 124.

Additionally, at block 550, the method 500 may determine each device's 100, 124 status. In one embodiment, a presence management module 140 organizes and displays external device 124 presence state and other information on a presence/nearby device user interface 145 of both devices 100, 124. For example, a "busy" presence status may be determined by the presence module 140 when a device 100, 124 is processing a media object 400 or a data stream send by a different device. An "online" status may indicate that the sending device 124 is not currently engaged in any activity.

Also, a "show blocked" option 1020 may be included on either the device 100 or the external device 124 blocked list. Upon displaying locked nearby devices, the user may also be presented with an "unblock" option for those previously blocked devices. Many additional embodiments of determining device characteristics are also possible.

Figure 11B:
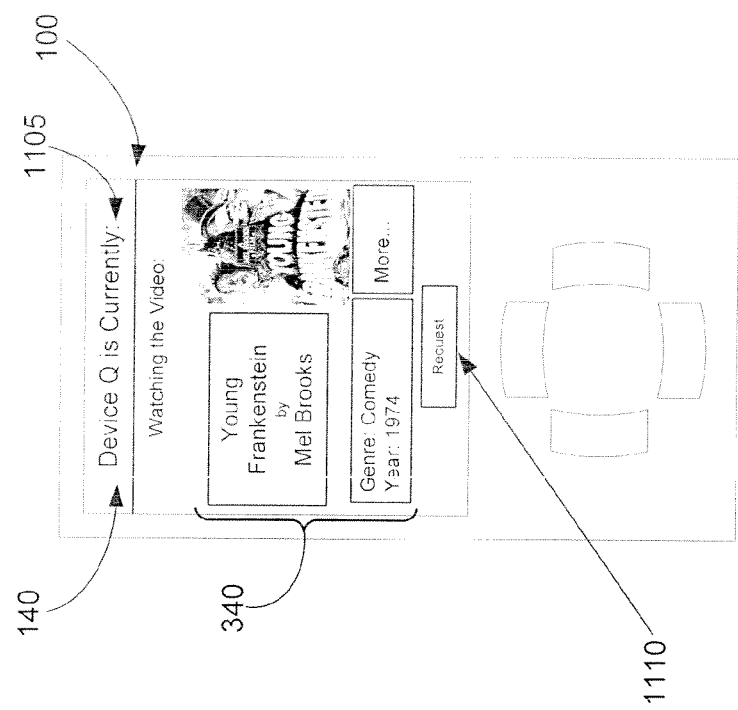
Figure 11A:
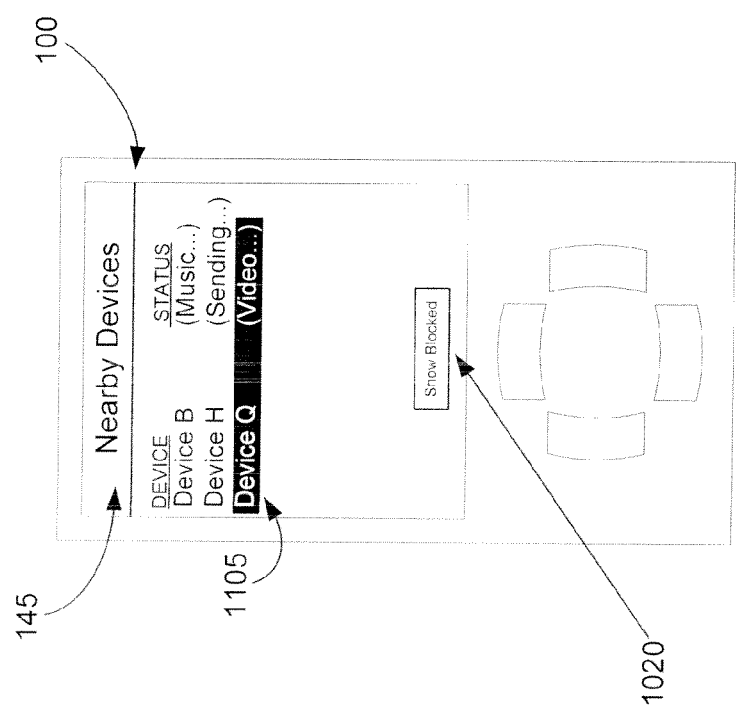

At block 555, the devices 100, 124 may display data associated with connected devices. With further reference to FIG. 11(a), a user may optionally display all devices 100, 124 transmitting a usable signal, or may exclude specific devices or groups of devices from the display in the presence/nearby device user interface 145 without sending them to a "blocked list." In one embodiment, a user may access data by selecting a device 1105 from the user interface 145. As previously discussed in relation to block 515, in one embodiment, the method 500 may only connect compatible devices 100, 124, therefore, the user interface 145 may only display compatible device information. In another embodiment, incompatible device information may be accessible to the user and may be available for interaction. In a further embodiment, after selecting a connected device 1105 from the presence/nearby device user interface 145, the user may discover the media characteristics 240 of a media object 400 currently playing on the connected device. Users may also discover information associated with music, radio, and any other media object 400 type being processed on or streamed to connected devices as well as information related to personal photographs and other device data.

In a still further embodiment, the device 100 user optionally requests 1110 the media object that is currently playing as shown in the nearby device interface 145. For example, selecting the request 1110 button may initiate an exchange of the currently playing media object to the external device 100. The exchange may be a direct stream from the external device 124 as the media object 400 is currently playing, or may transfer a copy of the complete media object 400 to the device 100. In another embodiment, playback of the transferred media object 400 initiated by the request 1110 is subject to one or more media object 400 licenses 430, 435, 440, 445, 450, or a default license.

In a still further embodiment, a device 100, 124 user sorts and organizes the nearby devices in the nearby devices user interface. For example, the user may set nearby device preferences that may sort devices in the user interface 140 by a desired media object 400 genre, a time of connection, a strength of friendship ranking, a friend group, or any other characteristic that may be determined in association with block 550 as previously described.

Also, privacy settings 235, 335 may also restrict the date displayed at block 555. Privacy settings may be customized by the user for all connected devices, or may be tailored to individual users or groups of users. In one embodiment, privacy settings only permit the device status of "busy," "online," or "blocked" associated with a particular connected device 100, 124 to be displayed. In a further embodiment, the privacy settings 235, 335 allow viewing limited or full details of the connected devices 100, 124.

After completing the method 500, the devices 100, 124 may continue to transfer management frames or other communications to establish a complete connection and transfer data as desired.

Much of the inventive functionality and many of the inventive principles are best implemented with or in software programs or instructions and integrated circuits (ICs) such as application specific ICs. It is expected that one of ordinary skill, notwithstanding possible significant effort and many design choices motivated by, for example, available time, current technology, and economic considerations, when guided by the concepts and principles disclosed herein will be readily capable of generating such software instructions and programs and ICs with minimum experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

We claim:

1. A method for managing presence data for a first and second media device comprising:
   sending an announcement message from the second media device to the first media device, the announcement message including:
      a second device profile including a second media device unique identifier, a second device media characteristic, wherein a device media characteristic comprises at least one of: media file metadata, media device current activity, statistical information associated with media files on the device, or metadata of a media file currently being played on the device, and
      a second media device presence preference, wherein a media device presence preference limits presence visibility of a media device to an external device according to one of: data associated with the external device, or a media characteristic of the external device;
   receiving an acknowledgement message from the first media device at the second media device, the acknowledgment message including a first device profile including a first media device unique identifier, a first device media characteristic, a first media device presence preference, and a status;
   determining a first media device characteristic from the acknowledgement message;
   comparing the first media device unique identifier to entries on a second media device blocked list;
   comparing the first media device characteristic to a second media device presence preference;
   transmitting a media data file from the second media device to the first media device when the status in the acknowledgment message indicates that the second media device unique identifier does not match one of the entries on the first media device blocked list, and when the second media device characteristic matches the first media device presence preference, wherein the matching includes one or more of:
   a media data file metadata within a library of the second media device matching
   the media data file metadata of the presence preference of the first media device, the metadata including one or more of a title, an artist, an album, and a genre, a media device activity including the second media device actively communicating with another media device having a unique identifier matching an entry of a friends or trusted list of the first media device presence preference, and the media data file metadata of a media data file currently playing on the second media device matching the media data file metadata of the presence preference of the first media device.

2. The method of claim 1, further comprising transmitting the media data file from the second media device to the first media device if at least one of the first media device unique identifier does not match one of the entries on the second media device blocked list, and the first media device characteristic matches the second media device presence preference.

3. The method of claim 1, further comprising:
communicating an announcement message from a second media device to a first media device, wherein the first device is on a second media device trusted list; and
communicating the media file from the second media device to the trusted first media device.

4. The method of claim 1, wherein the first and second media device unique identifier includes a globally unique identifier based on the respective first and second device network interface card address and time stamp.

5. The method of claim 4, wherein the first and second media device presence preference includes the first and second device metadata.

6. The method of claim 1, wherein if the first or second media device unique identifier is one of the entries on the respective second or first media device blocked list, optionally removing the entry from the first or second media device blocked list.

7. The method of claim 1, wherein transmitting the media data file from the second media device to the first media device comprises:
playing the media data file on the second media device;
streaming the media data file from the second media device to the first media device.

8. The method of claim 1, wherein the acknowledgement message from the first media device and the announcement from the second media device includes a presence state.

9. The method of claim 8, wherein the presence state includes at least one of sleeping, busy, blocked, listening to music, listening to a radio station, watching a video, reading print media, playing a game, listening to or reading a message, or viewing a photo.

10. The method of claim 9, further comprising requesting a second media device media object from the first media device when the second media device presence state is at least one of listening to music, listening to a radio station, watching a video, reading print media, playing a game, listening to or reading a message, or viewing a photo.

11. The method of claim 1, further comprising exploring a second media device media library from the first media device upon transmitting the media data file from the second media device to the first media device.

12. The method of claim 1, further comprising:
receiving the announcement message at the first media device;
determining a second media device characteristic from the announcement message at the first media device;
comparing the second media device unique identifier to entries on a first media device blocked list;
comparing the second media device characteristic to a first media device presence preference; and
sending the acknowledgment message to the second device.

* * * * *